(12) United States Patent
Osiroff et al.

(10) Patent No.: US 11,390,016 B2
(45) Date of Patent: Jul. 19, 2022

(54) COMPLEX SHAPED 3D OBJECTS FABRICATION

(71) Applicant: Massivit 3D Printing Technologies Ltd., Lod (IL)

(72) Inventors: Ricardo Osiroff, Ganei Tiqwa (IL); Moshe Uzan, Beit Shemesh (IL); Igor Yakubov, Herzliya (IL); Shai Garty, Rehovot (IL); Cesar Manna, Rehovot (IL)

(73) Assignee: MASSIVIT 3D PRINTING TECHNOLOGIES LTD., Lod (IL)

( * ) Notice: Subject to any disclaimer, the term of this patent is extended or adjusted under 35 U.S.C. 154(b) by 55 days.

(21) Appl. No.: 16/351,599

(22) Filed: Mar. 13, 2019

(65) Prior Publication Data

US 2019/0210274 A1 Jul. 11, 2019

Related U.S. Application Data

(62) Division of application No. 15/960,584, filed on Apr. 24, 2018, now Pat. No. 10,328,635.
(Continued)

(51) Int. Cl.
*B29C 64/124* (2017.01)
*B29C 64/209* (2017.01)
(Continued)

(52) U.S. Cl.
CPC ........ *B29C 64/124* (2017.08); *B29C 33/3842* (2013.01); *B29C 39/026* (2013.01);
(Continued)

(58) Field of Classification Search
CPC ..... B29C 64/124; B29C 39/026; B29C 39/34; B29C 33/3842; B29C 64/209;
(Continued)

(56) References Cited

U.S. PATENT DOCUMENTS 5,149,548 A * 9/1992 Yamane ................ B29C 64/135
425/174.4
5,204,055 A 4/1993 Sachs et al.
(Continued)

FOREIGN PATENT DOCUMENTS

WO WO2017122211 * 7/2017

OTHER PUBLICATIONS

Moiridi et al., "Cold spray coating: review of material systems and future perspectives", Surface Engineering, vol. 36, No. 6, pp. 369-395, Mar. 2014.

*Primary Examiner* — Jeffrey M Wollschlager
(74) *Attorney, Agent, or Firm* — Manelli Selter PLLC; Edward Stemberger (57) ABSTRACT

An apparatus for manufacturing of 3D objects is provided. The apparatus includes a number of material deposition heads terminated by nozzles, of which one or two nozzles are configured to deposit a first material to form a first and second pattern layers. The pattern layers are laterally shifted from each other such that when the first and second pattern layers are deposited, a space (empty volume) with a varying cross section is formed. In some examples, two or more nozzles could be used to deposit the corresponding first and second pattern layers. The nozzles could move independent of each other.

15 Claims, 6 Drawing Sheets

Related U.S. Application Data (60) Provisional application No. 62/595,096, filed on Dec. 6, 2017.

(51) Int. Cl.

| | | |
|---|---|---|
| *B29C 64/245* | (2017.01) | |
| *B29C 64/393* | (2017.01) | |
| *B29C 33/38* | (2006.01) | |
| *B29C 39/02* | (2006.01) | |
| *B29C 39/34* | (2006.01) | |
| *B29C 64/40* | (2017.01) | |
| *B33Y 70/00* | (2020.01) | |
| *B33Y 10/00* | (2015.01) | |
| *B33Y 30/00* | (2015.01) | |
| *B33Y 50/02* | (2015.01) | |
| *B29C 39/00* | (2006.01) | |
| *B29C 64/241* | (2017.01) | |

(52) U.S. Cl.
CPC ............ *B29C 39/34* (2013.01); *B29C 64/209* (2017.08); *B29C 64/245* (2017.08); *B29C 64/393* (2017.08); *B29C 64/40* (2017.08); *B29C 33/38* (2013.01); *B29C 33/3835* (2013.01); *B29C 39/003* (2013.01); *B29C 39/006* (2013.01); *B29C 64/241* (2017.08); *B29C 2033/385* (2013.01); *B33Y 10/00* (2014.12); *B33Y 30/00* (2014.12); *B33Y 50/02* (2014.12); *B33Y 70/00* (2014.12)

(58) Field of Classification Search
CPC ... B29C 64/245; B29C 64/393; B29C 39/006; B29C 39/003; B29C 33/3835; B29C 33/38; B29C 2033/385; B29C 64/40; B29C 64/106; B29C 64/241; B29C 64/236; B33Y 70/00; B33Y 10/00; B33Y 30/00; B33Y 50/02
See application file for complete search history.

(56) References Cited

U.S. PATENT DOCUMENTS

| | | | | |
|---|---|---|---|---|
| 5,474,719 | A | * 12/1995 | Fan | B33Y 10/00 427/512 |
| 5,948,342 | A | 9/1999 | Nakazawa et al. | |
| 6,193,923 | B1 | 2/2001 | Leyden | |
| 6,397,992 | B1 | 6/2002 | Sachs et al. | |
| 6,569,373 | B2 | * 5/2003 | Napadensky | B41M 3/006 264/401 |
| 6,616,885 | B2 | 9/2003 | Lombardi et al. | |
| 6,627,835 | B1 | 9/2003 | Chung | |
| 7,074,358 | B2 | 7/2006 | Gybin | |
| 8,309,229 | B2 | 11/2012 | Nakahara | |
| 8,470,231 | B1 | * 6/2013 | Dikovsky | B29C 33/448 264/308 |
| 8,883,392 | B2 | * 11/2014 | Napadensky | C08L 71/00 430/263 |
| 8,974,213 | B1 | 3/2015 | Yakubov | |
| 9,011,136 | B1 | 4/2015 | Uzan | |
| 9,216,543 | B1 | * 12/2015 | Lisitsin | B33Y 70/00 |
| 9,364,995 | B2 | * 6/2016 | Roberts, IV | B29C 64/393 |
| 9,623,607 | B2 | 4/2017 | Uzan | |
| 2003/0085383 | A1 | 5/2003 | Burnell-Jones | |
| 2004/0070106 | A1 | 4/2004 | Harrington | |
| 2004/0198861 | A1 | 10/2004 | Ohno | |
| 2006/0158456 | A1 | * 7/2006 | Zinniel | B29C 64/188 345/589 |
| 2007/0181519 | A1 | 8/2007 | Khoshnevis | |
| 2011/0166056 | A1 | 7/2011 | Huber | |
| 2015/0321385 | A1 | 11/2015 | Stege | |
| 2015/0321418 | A1 | * 11/2015 | Sterman | B29C 64/118 264/40.7 |
| 2016/0176118 | A1 | * 6/2016 | Reese | B33Y 50/02 425/89 |
| 2016/0263839 | A1 | * 9/2016 | Miedema | B29C 64/40 |
| 2017/0024925 | A1 | * 1/2017 | Palmer | G06T 19/20 |
| 2017/0087768 | A1 | * 3/2017 | Bheda | B29C 64/165 |
| 2017/0217090 | A1 | * 8/2017 | Endoh | B29C 64/112 |
| 2018/0056395 | A1 | 3/2018 | Hofacker et al. | |
| 2018/0230246 | A1 | * 8/2018 | Vidavsky | C11D 7/06 |
| 2018/0257270 | A1 | * 9/2018 | Endoh | C08J 3/246 |
| 2018/0361673 | A1 | * 12/2018 | Hakkaku | B33Y 10/00 |
| 2019/0010270 | A1 | * 1/2019 | Ely | C08F 222/20 |
| 2019/0233634 | A1 | * 8/2019 | Ota | C08F 2/44 |
| 2020/0282636 | A1 | * 9/2020 | Nishimoto | C08G 77/06 |

* cited by examiner

COMPLEX SHAPED 3D OBJECTS FABRICATION

This application is a division of U.S. application Ser. No. 15/960,584, filed on Apr. 4, 2018, which claims the benefit of U.S. Provisional Patent Application 62/595,096 to the same inventors filed Dec. 6, 2017, entitled, "COMPLEX SHAPED 3D OBJECTS FABRICATION," which is incorporated herein by reference.

TECHNOLOGY FIELD

The present method and apparatus relate generally to manufacturing of 3D objects. More particularly, the present method and apparatus relate to automated methods and equipment for complex shaped 3D objects manufacture.

BACKGROUND

Three dimensional printing is a generic term encompassing different additive manufacturing technologies such as inkjet printing, selective material deposition, material extrusion, material sintering and others. The object is produced by depositing a layer of a material on top or bottom of previously deposited or dispersed layer of material and because of this is termed additive manufacturing (AM) process. In a large majority of cases the material from which the object is produced is a polymer that adheres to the previously deposited layer and is hardened or solidified by actinic radiation, such as ultraviolet radiation, thermal sources and others.

Most objects are not simple in their structure and include segments of complex shapes such as curved surfaces and surfaces that could overhang outside the main body of the object or in case a hollow object, protrude into a hollow void or cavity inside the object defined by the object walls. The surfaces could be inclined, oriented at different angles and have different thicknesses or sizes. Different types of material layers having different properties and strength could be required to print such objects. Composite materials are among the strongest materials used in manufacture of different objects. Composite materials offer unusual selection of properties while additive manufacturing processes provide some advantages for fabrication of objects with complex shapes.

Some composite materials are manufactured by forming the object by deposition of a mix of components that include for example, fibers mixed with different resins. Mixes of metal and metal matrices, glass, ceramics and ceramic matrices elements with resins are also known. The carbon, glass or aramid reinforcements usually are supplied in the form of a fabric. The process is largely manual, although machines for laying down different material fabrics and spraying over them a resin exist. A sandwich structured composite is a special class of composite material that is fabricated by attaching two thin but stiff skins to a lightweight and thick core. The skins are the outer layers and are constructed out of a variety of materials. Wood, aluminium, and plastics are commonly used. More recently though, advanced fiber reinforced composites are being used as skin materials. The manufacture of such 3D panels is relatively a straightforward process, however manufacture of complex 3D shapes is more challenging.

Complex, three-dimensional shapes are used in building boats and ships where decks and hulls are commonly made with curved composite laminates or sandwich type structures. Ships utilize curved composite laminates and sandwich type materials to reduce ship weight. In aerospace, complex three-dimensional shapes have been used for wings, doors, control surfaces, tail planes, stabilizers for both military and civil aircrafts, vehicles, caravans, industrial machinery covers and other articles.

A plurality of complex objects or articles such as impellers, rotor and engine blades, and a variety of other objects could also be manufactured using 3D printing techniques. Generally, an infinite variety of articles and complex objects can be manufactured using 3D printing, Production of such complex objects requires production of special large size moulds that by itself is a complicate labour-intensive task.

Although the number of materials currently used in 3D objects manufacture is not large, it is suitable for manufacture of a large selection of 3D objects. The color of the available materials is somewhat limited and the size of the 3D objects produced by the existing equipment is also limited. Usually, large size products are manufactured in several pieces that must be assembled into a finished product, which could be a challenging task.

Printing of three-dimensional articles is described in several United States patents, including the following U.S. Pat. No. 5,204,055 to Sachs et al., U.S. Pat. No. 6,193,923 to Leyden, U.S. Pat. No. 6,397,992 to Sachs et al., U.S. Pat. No. 6,627,835 to Chung, U.S. Pat. No. 7,074,358 to Gybin, U.S. Pat. No. 8,309,229 to Nakahara, U.S. Pat. No. 8,974,213 to Yakubov, U.S. Pat. No. 9,162,391 to Yakubov, U.S. Pat. No. 9,216,543 to Lisitsin, U.S. Pat. No. 9,623,607 to Uzan, US Pat. Appl. Pub. No. 2003/0085383 to Burnell-Jones, US Pat. Appl. Pub. No. 20040198861 to Ohno, US Pat. Applic. Pub. No. 20070181519 to Khoshnevis, US Pat. Appl. Pub. No. 20110166056 to Huber, US Pat. Appl. Pub. No. 20150321385 to Stege.

Definitions

As used in the current disclosure the term "complex shaped 3D object" means a 3D physical object including curved surfaces that could be convex or concave, flat surfaces and surfaces that could overhang outside the main body of the object or in case a hollow object, protrude into a hollow void or cavity inside the object defined by the object walls. The surfaces could be inclined, oriented at different angles and have different thicknesses or sizes. Complex shaped 3D objects could be made of any type of homogeneous or composite material.

As used in the current disclosure, the term pattern layer/s means elements that when deposited on a substrate or printing apparatus table form an empty space into which an additional material could be deposited or casted.

The term Dalton is a System International (SI) unit for molar mass and because of historical reasons it is also used to designate molecular weight.

SUMMARY

A method and apparatus for manufacturing of 3D objects. The apparatus includes a number of material deposition heads terminated by nozzles, of which one or two nozzles are configured to deposit a first material to form a first and second pattern layers. The pattern layers are laterally shifted from each other such that when the first and second pattern layers are deposited, a space (empty volume) with a cross section that varies between the first and second pattern layers is formed. In some examples, only one nozzle could be used to deposit the first and second pattern layers. In other examples, two or more nozzles could be used to deposit the corresponding first and second pattern layers. The nozzles could move independently of each other.

An additional material deposition nozzle is configured to deposit in the space between the first and second pattern layers a second material. The second material fills the space between the first and second pattern layers and forms a complex shaped 3D object identical in shape to the space between the first and second pattern layers. In some examples the method and apparatus are characterized in that the first and second pattern layers and the complex shaped 3D object are deposited sequentially, although in some examples the first and second material could be deposited simultaneously or almost simultaneously.

Typically, the materials from which the first and second pattern layers and the second material are materials that when exposed to actinic radiation, temperature or pressure, or mixture of resin and hardener, change their aggregate state, i.e, the materials are solidify or harden. Accordingly, both materials change their aggregate state. Typically, the pattern layers solidify before the second material is deposited. The first material has mechanical properties different from the second material. The second material supports inclusion into it of additional materials or additives. The additional materials or additives could have properties different from the properties of the second material, for example, ceramic, metal or mineral powder fillers, glass and other fibres, rheological modifiers and other materials. The additional materials could enhance a desired property of the second material.

Upon completion of the second material hardening, the pattern layers are removed by any known removal method and in particular by exposure to tap water, heat or mechanical action. The patterning layers display high water absorption, but limited swelling, therefore, the pattern material breaks into beads, followed by washing it with excess of water. The pattern layers material composition is based on hydrophilic monomers combined with hydrophilic or hydrophobic cross linkers. This chemical structure allows rapid swelling of the polymer but not fully dissolve in the water. The outcome of high stress, the hydrogel break into beads that can be easily collected into a mesh, for example, by filtering the water through a mesh filter.

In one example the material deposition nozzles and the table have freedom of linear movement with respect to each other in three different directions. In an additional example, the material deposition nozzles are configured to move in a radial and axial directions and the table is configured to rotate and move in a desired direction.

LIST OF DRAWINGS AND THEIR BRIEF DESCRIPTION

The features and advantages of the disclosure will occur to those skilled in the art from the following description and the accompanying drawings, in which like parts have been given like numbers.

DESCRIPTION

Existing methods and apparatuses for fabrication of complex shaped 3D objects, such as large shells, moulds and similar are largely time consuming and labour intensive. Typically, such complex 3D objects and in particular large complex shaped 3D objects are manufactured in several steps; first the complex shaped 3D object data is cut into segments, then each segment is manufactured, and finally the segments are assembled into a large complex shaped 3D object. For example, a casting form, sometimes termed as a mould, is typically prepared from two or more separate segments or parts that are assembled into a final casting form. Then another material, from which the desired complex shaped 3D object will be manufactured is deposited or casted into the earlier prepared casting form. These are time consuming and costly procedures.

The present disclosure describes a method and apparatus supporting fabrication of a complex shaped 3D object by depositing a pattern of layer/s followed by filling the pattern with casting material. The method and apparatus facilitate production of casting forms and other tools necessary to manufacture complex shaped 3D objects.

The present disclosure also provides a manufacturing method of complex shaped 3D objects, which overcomes the disadvantages of the existing methods, and provides a useful alternative for manufacture of large complex shaped 3D objects. The method suggests a sequential or almost concurrent manufacture steps of the pattern layers and the complex shaped 3D object. Typically, the first and second pattern layers and the large complex shaped 3D object are manufactured in sequence where the first and second pattern layers are deposited first and following the pattern layers hardening, the large complex shaped 3D object material is deposited.

Traditionally, manufacture of such complex shaped 3D objects or structures is usually accomplished by introduction of so called support elements or structures similar to scaffolds used in building construction. Upon completion of object manufacture, the support elements have to be removed. In most cases the support structures are removed by mechanical means such as knives, pliers and putty type scrappers. Use of such mechanical means requires significant manual work and subsequent processing to smoothen the surface where the support was attached. Additionally, some support structures located in the inner cavities of the mould or casted article cannot be removed.

Pattern layers usually have to meet a number of conditions: maintain the printed object integrity, to be easily removable from the external and the internal surface of the complex shaped 3D object and when removed they do not damage the outer or inner surface of the complex shaped 3D object. In some examples, of the present disclosure the pattern layers could be made of a tap water breakable material. Some pattern layers structures could be easy breakable by heating or a mechanical force, such as hammering or pressure.

There is a need to simplify and accelerate production of tools for complex mould and casting forms production, using improved pattern materials for 3D printing or extrusion, including pattern layers materials that can be strong enough and could be removed in an easy way.

Figure 1:
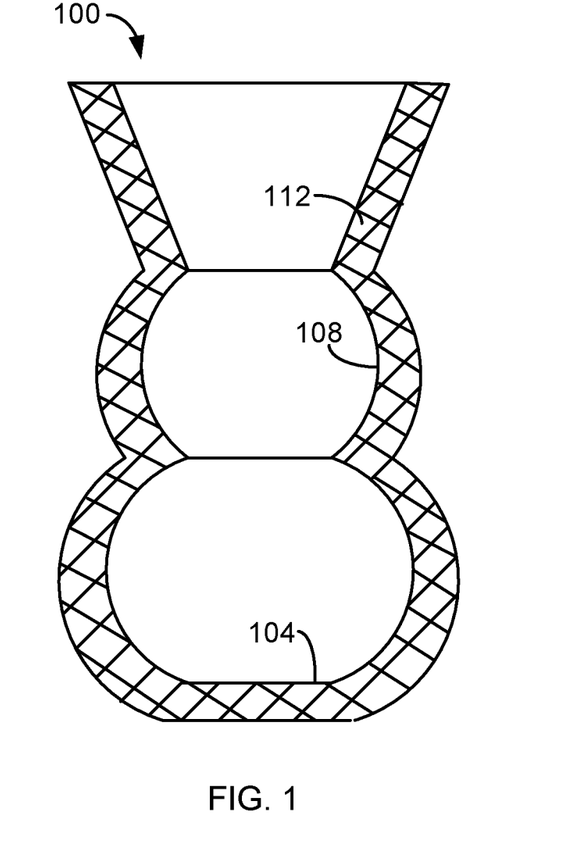
FIG. 1 is an example of a large size complex shaped 3D object.

FIG. 1 is an example of a large size complex shaped 3D object. Complex shaped 3D object 100 could be about 1500 mm or more high/tall and have a diameter of 400 or 500 mm. The object includes flat 104, convex and concave surfaces 108. Additionally, the surfaces could be inclined, oriented at different angles and the walls of 3D object 100 could have different thicknesses or sizes.

Figure 2:
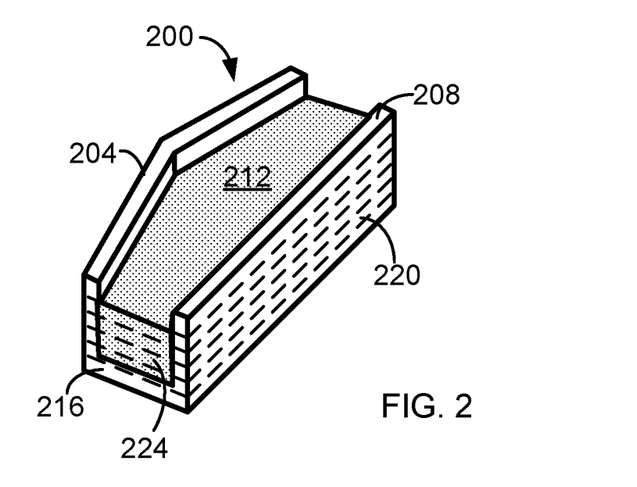
FIG. 2 is another example of a large size complex shaped 3D object.

FIG. 2 is an example of another large size complex shaped 3D object. Complex shaped 3D object 200 could be a panel of a ship or a segment of a plane. 3D Object 200 could be about 1500 mm long and have a thickness of for example, 10 to 500 mm. The material of the complex shaped 3D object 200 is casted into a space between two stiff pattern layers 204 and 208 and forms a core 212 located between pattern layers 204 and 208. Upon completion of core 212 hardening, pattern layers 204 and 208 could be removed. In some examples, pattern layers 204 and 208 could be combined with a bottom pattern layer 216 made of the same material as pattern layers 204 and 208 are made.

Complex shaped 3D object 200 is produced as a layered object. By performing several successive passes a desired number of hardened pattern layers 220 of the first material could be deposited. In a similar or different manner the casted complex shaped 3D object material layers 224 could be deposited and a complex shaped 3D object could be manufactured or fabricated. Pattern layers 220 and casted object material layers 224 could be of the same or different thickness. Typically, casted complex shaped 3D object material layers 224 are deposited after several pattern layers 220 are deposited and hardened. The delay could be defined by time required to deposit 3-30 pattern layers 220.

Figure 3A:
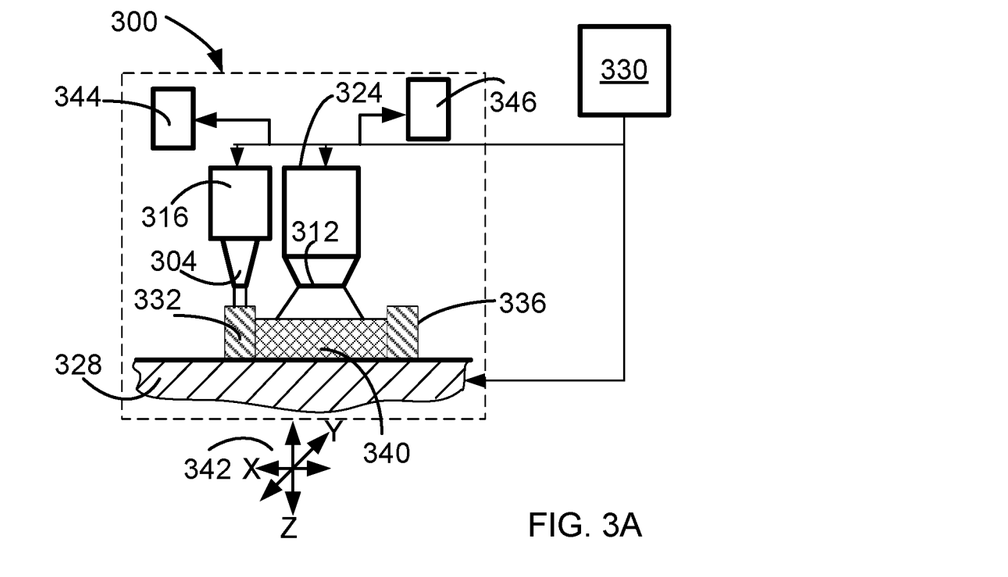
FIG. 3A is an example of an apparatus suitable for manufacture of complex shaped 3D objects.

FIG. 3A is an example of an apparatus suitable for manufacture of a complex shaped 3D object. Apparatus 300 includes a pattern layers material deposition nozzle 304 configured to deposit a first or pattern layers material and a nozzle 312 configured to deposit a second or casted article 340 material. The material deposition nozzle 304 is configured to deposit a first material to form a first 332 and second 336 pattern layers. Since, the first 332 and second 336 pattern layers are laterally shifted, nozzle 304 could deposit them in different manners, e.g., build-up a certain height of pattern layer 332 and shift to build-up a similar or different height of pattern layer 336. The laterally shifted first 332 and second 336 pattern layers form a space (empty volume) with a cross section that varies along the first 332 and second 336 pattern layers. Processor 330 is configured to receive the complex shaped 3D object data and convert it to movement of nozzle 304 and 312 and respective material deposition rate. Processor 330 changes the distance between the first 332 and second 336 pattern layers as a function of the shape and wall thickness of the complex shaped 3D object to be produced. Processor 330 also changes the amount of the second material 340 to be deposited by nozzle 312 in the varying space or volume between the first 332 and second 336 pattern layers. Nozzle 304 communicates with respective material supply mechanism 316 configured to supply the first material to nozzle 304 and nozzle 312 communicates with a material supply mechanism 324 configured to supply to nozzle 312 the second material 340. The second material deposition rate is also controlled by processor 330 and could be adjusted to provide a sufficient amount of the second material to fill the varying space between the first 332 and second 336 pattern layers.

In addition to controlling the first and second material deposition rate, processor 330 controls the relative displacement speed of nozzles 304 and 312 and table 328. Table 328 is configured to receive and hold the first type of material and the second type of material. Table 328 could move in multiple (at least three) directions (for example X, Y, Z) as shown by arrows 342 to accommodate during material deposition for changing size or dimensions of the manufactured complex shaped 3D object. Alternatively, nozzles 304 and 312 could be moved in multiple directions, for example the vertical (Z) and horizontal (X, Y) directions. In some examples table 328 could be heated to a higher than the environment temperature for faster initiation of curing or hardening of the second material.

Nozzle 304 forms a first and second pattern layers 332 and 336 of the casting form or mould of the complex shaped 3D object e.g., object 200 or similar. The first material deposited or extruded by nozzle 304 could be a pseudo-plastic material in gel aggregate state such as the material disclosed in U.S. Pat. No. 9,216,543 and U.S. patent application Ser. Nos. 14/943,395 and 15/665,472 all to the same assignee. The pseudo-plastic gel, is commercially available under name DIMENGEL® from the assignee of the present application, flows through the deposition nozzle 304 because of the agitation applied by mechanism 316. The gel's elasticity recovers immediately after leaving the nozzles, and the gel solidifies or hardens to maintain or regain its shape and strength. After leaving the nozzle the material is no longer under stress and the network recovers immediately, resulting in the gel re-solidification Immediately after the gel solidification the gel is exposed to UV light for fixating the gel as fully polymerized to crosslinked. The solidified or hardened gel forms first 332 and second 336 pattern layers or walls 332 and 336 of the casting form or mould for complex shaped 3D object.

DIMENGEL® however does not support easy patterns layers removal. The present disclosure suggests a material facilitating easy patterns layers removal. The novel pattern layers material composition based on hydrophilic monomers combined with hydrophilic or hydrophobic crosslinks. This chemical structure allows the rapid swell of the polymer but not full dissolution in the water. The outcome of the high stress, the hydrogel break into beads that can be easily collected into a sieve, for example, by filtering the water through a sieve filter.

Rapid solidification or hardening of pattern layers or walls 332 and 336 (also termed as layer pinning) takes less than 1 second and facilitates second material deposition by nozzle 312. Rapid solidification or hardening of pattern layers or walls 332 and 336 maybe further accelerated by use of a photo-initiator pre-embedded within the gel formulation and ultraviolet (UV) radiation provided by a UV source. This second material 340 is the casting material of the complex shaped 3D object to be fabricated or manufactured. The second material 340 could be selected from a large group of materials and large techniques for polymerization including mixture of resin and hardener in different ratios, or external initiation including heat, light, microwave, electron beam or any source of external radiation. The outcome of thermally curable polymer material can be initiated using catalyst or initiator, catalytic pair, curable polymers of catalyst and room temperature accelerator. The polymers include combination of step growth polymerization using monomers pairs, or chain-growth polymerization, polycondensation, or ring opening polymerization. The thermosetting polymers include large types of polymers including: Epoxy resins, Vinylesters, Polyesters, Acrylates, Polyurethanes, Polyurea, Vulcanized rubber, phenol-formaldehyde, Urea-formaldehyde, Melamine resin, Benzoxazines, Polyimides, Bismaleimides, Cyanate esters, polycyanurates, and Silicones (Referred to hereinafter as thermosetting polymers.) In some examples, artificial stones compositions consisting of a mixture of inorganic and organic components could be casted. The inorganic components of artificial stones could be such as crashed marble or granite, glass and carbon fibres or glass particles, metallic particles of aluminium or alloys such as boron-nitride. The binder for the casting material could also be inorganic, such as cement, gypsum and similar.

The second material is deposited in the space between pattern layers 332 and 336 and forms together with the pattern layers or walls a strong reinforcement structure. When the curable polymer 340 is extruded from nozzle 312 by apparatus 300 in layer form, the material layers solidify upon being subject to mixing, heat or actinic radiation. Being in permanent contact with pattern layers 332 and 336 the material solidifies and enhances the strength of the complex shaped 3D object.

In some examples, the solidification or hardening process of second material 340 could be enhanced and accelerated by a source of thermal (heat), microwave, IR radiation, electron beam or any source of external radiation configured to harden (cure) the second type of material.

The first material could have physical properties different from the second material. The properties could include modulus of elasticity, transparency, appearance, material hardening radiation wavelength and other properties. In some examples, sources of material hardening radiation 344 and 346, for example UV (ultraviolet) radiation could be arranged to irradiate the desired part of the complex shaped 3D object or pattern layers. Processor 330 is also configured to control operation of all types of sources of material hardening radiation.

Figure 3B:
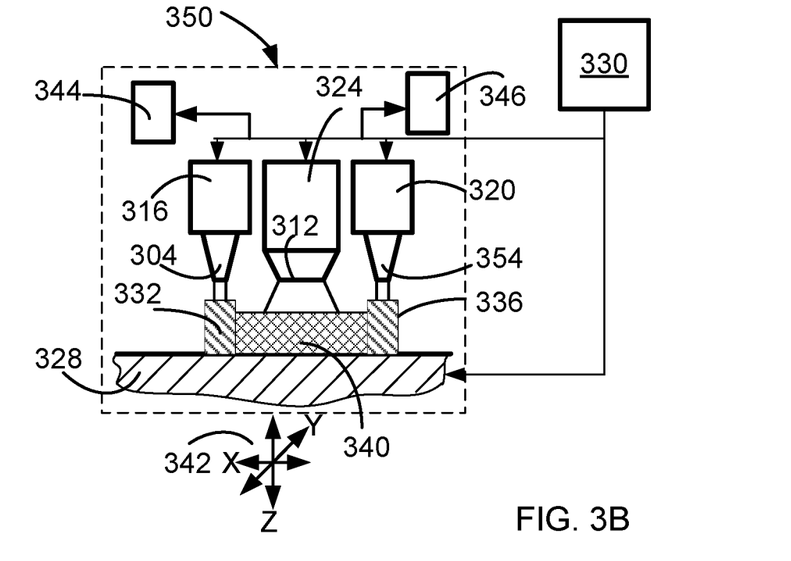
FIG. 3B is another example of an apparatus suitable for manufacture of complex shaped 3D objects.

FIG. 3B is another example of an apparatus suitable for manufacture of a complex shaped 3D object. Apparatus 350 includes two material deposition nozzles 304 and 354 located at a variable distance or laterally shifted with respect to each other and configured to deposit a first material and a nozzle 312 configured to deposit a second material. The two material deposition nozzles 304 and 354 are configured to deposit a first material to concurrently form a first 332 and second 336 pattern layers. Material deposition nozzles 304 and nozzle 312 could move in the vertical (Z) and horizontal (X, Y) directions independently of each other, similar to what is disclosed in U.S. Pat. Nos. 9,011,136 and 9,623,607 to the same assignee. The first 332 and second 336 pattern layers form a space (empty volume) with a cross section that varies along the first 332 and second 336 pattern layers. Processor 330 is configured to receive the complex shaped 3D object data and convert it to movement of nozzle 304 and 354 and respective material deposition rate. Processor 330 changes the distance between nozzle 304 and 354 to deposit the first 332 and second 336 pattern layers as a function of the shape and wall thickness of the complex shaped 3D object to be produced. Processor 330 also changes the amount of the second material 340 to be deposited by nozzle 312 in the varying space or volume between the first 332 and second 336 pattern layers.

The distance or gap between the first 332 and second 336 pattern layers changes also as a function of design. Nozzles 304 and 354 communicate with respective material supply mechanisms 316 and 320 configured to supply the first material to nozzles 304 and 354 and nozzle 312 communicates with a material supply mechanism 324 configured to supply to nozzle 312 the second material 340. A processor 330 is configured to receive the complex shaped 3D object data and convert it to respective material deposition rate. The second material deposition rate is also controlled by computer 330 and could be adjusted to provide a sufficient amount of the second material to fill in the varying space or volume between the first 332 and second 336 pattern layers.

In addition to controlling the first and second material deposition rate, processor 330 controls the relative displacement speed of nozzles 304, 354 and nozzle 312 and table 328. Table 328 is configured to receive and hold the first type of material and the second type of material. Table 328 could move in three directions (for example X, Y, Z) as shown by arrows 342 to accommodate during material deposition for changing size or dimensions of the manufactured complex shaped 3D object. Alternatively, nozzles 304 and 354 and nozzle 312 could be moved in the vertical (Z) and horizontal (X, Y) directions independently of each other. In some examples table 328 could be heated to a higher than the environment temperature to pattern faster initiation of curing or hardening of the second material.

Nozzles 304 and 354 deposit the first and second pattern elements layers 332 and 336 of a complex shaped 3D object 300 (100 or 200). The first material deposited or extruded by nozzles 304 and 308 could be a water breakable material, heat radiation or a mechanical action, such as force/pressure breakable material.

Use of breakable material for pattern elements layers 332 and 336 facilitates easy patterns layers removal. For example, a pattern layers material composition based on hydrophilic monomers combined with hydrophilic or hydrophobic cross linkers. This chemical structure allows the rapid swelling of the polymer but not fully dissolve in the water. As the outcome of high stress, the hydrogel break into beads that can be easily collected into a sieve, for example, by filtering the water through a sieve filter.

Typical first material or water breakable material composition includes acrylamide, methacrylamide, acrylate, acrylic acids and its salts, hydroxy(meth)acrylate, carboxy (meth)acrylate, acrylonitrile, carbohydrate monomers, methacrylate and polyfunctional acrylics.

Typical first material or water or heat radiation breakable material composition could further include poly(ethylene glycol) (PEG), otherwise known as poly(oxyethylene) or poly(ethylene oxide) (PEO) at molecular weight (MW) range from 44 Dalton through oligomers at low molecular weight to high molecular weight polymers up to 300,000 Dalton. The PEG oligomers or polymers can be heterobifunctional, homobifunctional, monofunctional, PEG Dendrimers and Multi-arm PEGs and PEG Copolymers. The PEG based polymers display low melting temperature (Tm), at 60° C., therefore it is easily break under exposure to mild heat. Similar materials can be of low melting temperature includes polycaprolactone (PCL), ethylene-vinyl acetate copolymers (EVA), Polyethylene-co-methacrylic acids, Polypropylene carbonate (PPP) or similar polymer displaying Tm at about 45-60 degree C.

In addition, non-reactive additives can be included, including water or organic solvents. In addition to those solvents, short oligomers can be included to be used as plasticizers, reducing the melting temperature and the polymer rigidity.

In some examples, other than thermosetting polymers materials could be deposited between the pattern layers.

Such materials could be different waxes, water resistant photopolymers, water-based mixtures with mineral binders such as cement, gypsum and others.

In some examples, the solidification or hardening process of second material 340 could be enhanced and accelerated by a source of curing radiation configured to harden (cure) the first type of material and a source of radiation configured to harden (cure) the second type of material. The source of curing radiation configured to harden (cure) the second type of material could be a thermal, microwave or IR source of radiation. The heating is enhancing not only the curing yield but also its speed, for faster and more efficient polymerization.

Apparatus 350 deposits simultaneously the first and second pattern layers 332 and 336. In some examples, there could be a delay between deposition of pattern layers 304 and 308 and the complex shaped 3D object casting material 340. Typically, casted complex shaped 3D object material layers 224 are deposited after several pattern layers 332 and 336 are deposited and hardened. The delay could be defined by time required to deposit 3-30 pattern layers 332 and 336. By performing a number of successive passes a desired number of hardened layers of the second material bounded by the first material could be deposited and a 3D object could be produced.

In some examples, sources of material hardening radiation 344 and 346 could be arranged to irradiate the desired part of the complex shaped 3D object or pattern layers. Processor 330 is also configured to control operation of sources of material hardening radiation 344 and 346. Sources of material hardening radiation 344 and 346 could also include sources of the second material hardening radiation.

Figure 4A:
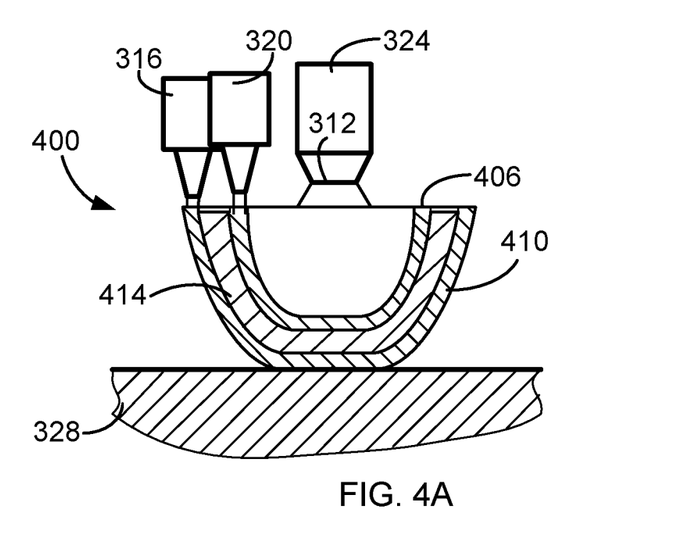
FIG. 4A is still another example of an apparatus suitable for manufacture of a complex shaped 3D objects.
Figure 4B:
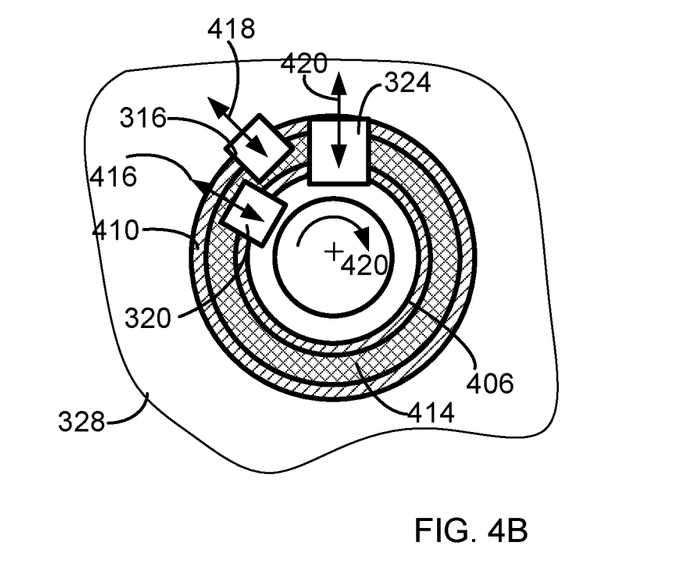
FIG. 4B is still another example of an apparatus suitable for manufacture of a complex shaped 3D objects.

FIG. 4 is another example of an apparatus suitable for manufacture of a complex shaped 3D objects. Apparatus of FIG. 4A simplifies manufacture of symmetrical 3D objects. Object 414 is a complex shaped symmetric 3D object similar to complex shaped 3D object of FIG. 1. Pattern layers 406 and 410 could form between them a space into which the second material forming object 414 is casted. Table 328 in addition to linear movement is configured to provide a rotational movement as shown by arrow 420. Rotational movement of table 328 is supplemented by radial movement of first and second material deposition nozzles illustrated by their material supply mechanisms 316, 320 and 324. Combination of table 328 rotation and independent radial movement (arrows 416, 418 and 420 in FIG. 4B) of material deposition heads 316, 320 and 324, facilitates fabrication or production of symmetrical articles 414 with variable geometry, for example the diameter of the 3D object could vary, amount of casted material, or distance between boundary elements 406 and 410 could vary. Additionally, table 328 could move in multiple directions to accommodate for changing size of the complex shaped 3D object 414. Alternatively, nozzles 304 and 308 and nozzle 312 could be moved in multiple directions (X, Y, Z) or at least in one direction.

Similar to the previously disclosed method, the second material is a thermally curable polymer material, i.e., thermosetting polymers, deposited in the volume or space between pattern elements layers 406 and 410 forms a strong pattern or self-patterning structure. When the thermally curable polymer 414 is extruded from nozzle 312 by apparatus 400 in layer form, the thermally curable polymer material layers solidify upon being subject to heat or infrared radiation. Being in permanent contact with pattern layers 406 and 410 the thermally curable polymer material solidifies and enhances the strength of the complex shaped 3D object.

According to an additional example the complicated shapes closest to second material 414 (or 340) side of pattern structure element 332 could include a relief that will be copied to thermally curable polymer 414 (or 340) of the casted material of the complex shaped 3D object.

In a further example apparatuses 300 and 400 could include more than one head 324 with nozzle 312. Additional heads with nozzles 312-1 and 312-2 could deposit material different from the material deposited by nozzle 312. These materials could be different in appearance, colour and structure to form on complex shaped 3D object side closest to pattern layers 410 a decorative pattern.

Figure 5:
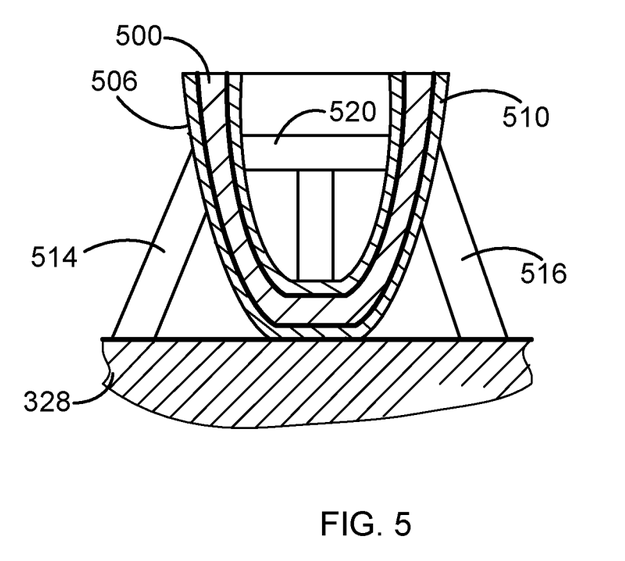
FIG. 5 is an example of pattern layers suitable for manufacture of heavy complex shaped 3D objects.

Pattern layers usually have to meet several conditions: maintain the printed object integrity, to be easily removable of the 3D object and when removed they do not damage the surface of the 3D object. When a very large and or heavy complex shaped 3D object 500 (FIG. 5) has to be manufactured, the pattern layers 506 and 510 could be further enhanced by additional (known in the art) supports 514, 516 and 520. Additional support structures 514, 516 and 520 maintain the complex shaped 3D object integrity, and could be made of the same water or heat radiation breakable material as pattern layers are made or a different material. Since support structures 514, 516 and 520 have no contact with complex shaped 3D object 500 and their removal will not leave any impressions or artefacts on the surface of complex shaped 3D object 500 and as such they could be made of other than water breakable materials.

Figure 6:
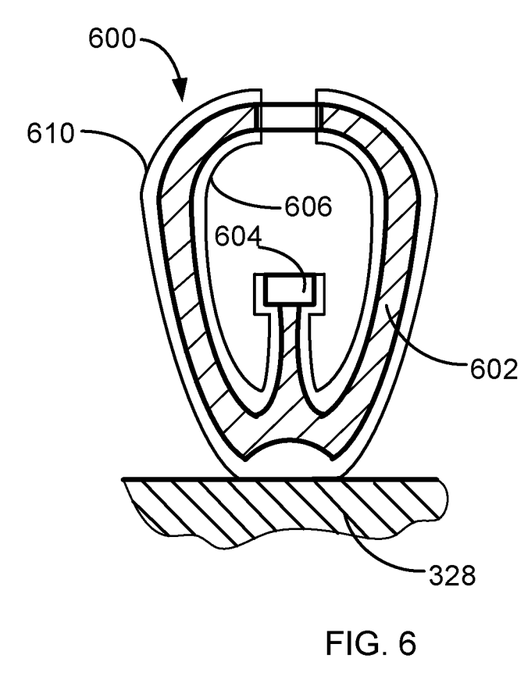
FIG. 6 is a plan view of large size complex shaped 3D object.

FIG. 6 is a plan is a view of large size complex shaped 3D object. Complex shaped 3D object 600 includes an additional 3D object 604 located in the inner cavity of complex shaped 3D object 600. Numerals 606 and 610 mark respective pattern layers made from the first material that could be described above water or heat breakable material facilitating easy patterns layers removal. Numeral 602 marks the casting material of complex shaped 3D object 600.

Use of the water or heat breakable material offers a large design freedom. It allows for complex geometries to be produced by using a pattern that "on command" disappear, leaving the complex geometry of the casted material, without the need for designing complex mold.

Figure 7A:
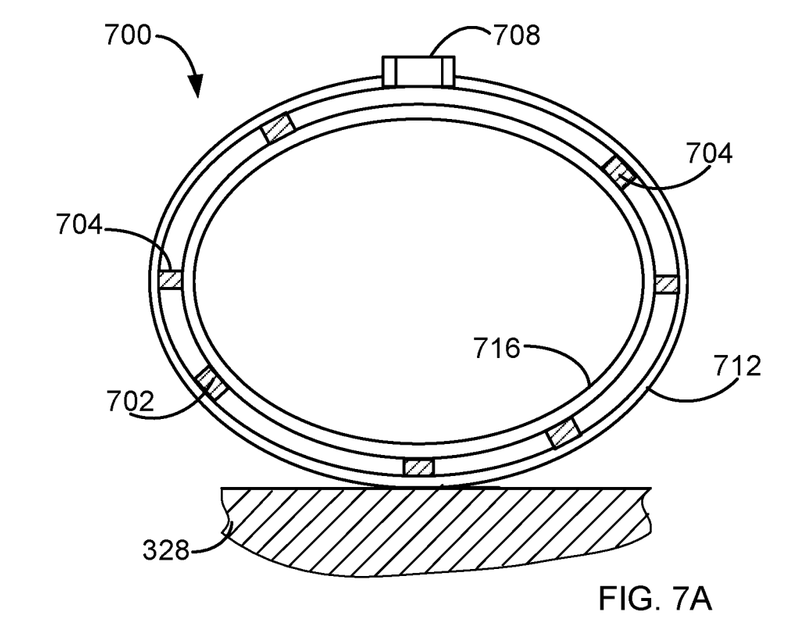
FIG. 7A is a further example of a method of manufacture of a complex shaped 3D object.
Figure 7B:
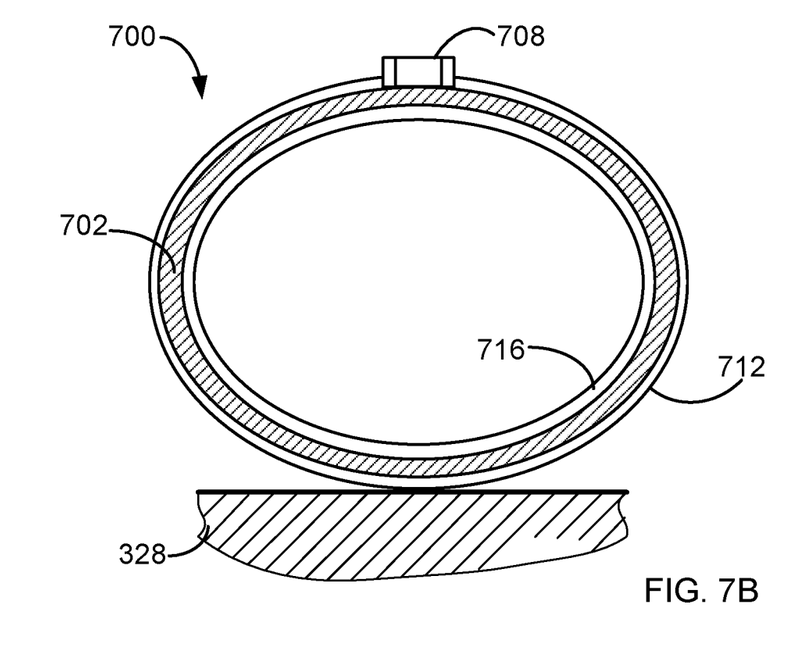
FIG. 7B is still a further example of a method of manufacture of a complex shaped 3D object.

In a further example, illustrated in FIG. 7 the material 702 from which the complex shaped 3D object 700 is formed is deposited in arbitrarily selected locations of volume 704. Material 702 deposited in course of object 700 manufacture. A filling opening 708 could be provided in at least one of pattern layers 712 and/or 716. Although complex shaped 3D object 700 is shown as a closed object, it could be a truncated object with free access to both of pattern layers 712 and/or 716.

Upon completion of pattern layers 712, 716 and material 702 deposited in arbitrarily selected locations 704 of volume enclosed between pattern elements layers 712 and/or 716, pattern layers 712, 716 could be removed from the 3D printing machine and the space between them filled by material 702 or a similar one. Such method releases the machine for printing the next part and supports use of a variety of different materials that could be sequentially introduced through filling opening 708. The materials could be of different colour or possess different mechanical properties. Objects of composite materials could also be produced using this method. The hardening of such materials could be accomplished off-line.

The method and apparatus have been described in detail and with reference to specific examples thereof, it will be apparent to one of ordinary skill in the art that various changes and modifications can be made to the method and apparatus without departing from the spirit and scope thereof.

What is claimed is:

1. A system comprising:
   a first material composition of pseudo-plastic material configured to be in a gel aggregate state under stress and configured to be in a gel solidification state when no longer under stress;
   a second material different from the first material composition and having inclusions of additive materials with properties different from the properties of the second material therein;
   a first material deposition nozzle;
   a material supply mechanism configured to supply the first material composition to the first material deposition nozzle; wherein the material supply mechanism is configured to agitate the first material composition to be in the gel aggregate state, and the first material deposition nozzle is configured to dispense a flow of the first material composition in the gel aggregate state, so that upon leaving the first deposition nozzle, first material composition is no longer under stress and is in the gel solidification state so as to form a first and second pattern layer such as to form a space with a cross section that varies along with the first and second pattern layer;
   at least one second material deposition nozzle configured to deposit in a space between the first and the second pattern layer the second material to form a shaped 3D object identical in shape to the space between the first and second pattern layers; and
   at least one source of curing radiation to cure the first material composition to a hardened state,
   wherein the at least one second material deposition nozzle is configured to deposit the second material following hardening of the first and second pattern layer.

2. The system according to claim 1, wherein the at least one source of curing radiation is configured to harden at least the first material and wherein the at least one source of the curing radiation is a UV source.

3. The system according to claim 2, further comprising at least one hardening source configured for hardening the second material and wherein the at least one hardening source is a source of heat, microwave, or IR radiation energy source.

4. The system according to claim 1, further comprising a processor configured to receive shaped 3D object data and convert it to movement of the nozzles and respective material deposition rates.

5. The system according to claim 4, wherein the processor is configured to change an amount of second material to be deposited in the varying space between first and second pattern layers.

6. The system according to claim 4, wherein the processor is configured to control relative displacement speed of the nozzles.

7. The system according to claim 1, further comprising a table configured to receive and hold the first material and the second material.

8. The system according to claim 7, wherein the table is configured to move in at least three directions including X, Y, Z directions to accommodate in course of material deposition for changing size or dimensions of a manufactured shaped 3D object.

9. The system according to claim 7, further comprising a heater to heat the table, such that a temperature of the table is higher than the environment temperature for faster hardening of the second material.

10. The system according to claim 7, wherein the material deposition nozzles are configured to move in a radial direction and the table is configured to rotate.

11. The system according to claim 1, wherein the additive materials are at least one of a group of materials: ceramic, metal, or mineral powder fillers, glass and fibres, and rheological modifiers.

12. The system according to claim 1, wherein the material deposition nozzles are configured to move independent from each other in at least three directions including X, Y, Z directions.

13. A system comprising:
    a first material composition of pseudo-plastic material configured to be in a gel aggregate state under stress and configured to be in a gel solidification state when no longer under stress;
    a second material different from the first material composition and having inclusions of additive materials with properties different from the properties of the second material therein;
    a first material deposition nozzle;
    a material supply mechanism configured to supply the first material composition to the first material deposition nozzle, wherein the material supply mechanism is configured to agitate the first material composition to be in the gel aggregate state, and the first material deposition nozzle is configured to dispense a flow of the first material composition in the gel aggregate state, so that upon leaving the first deposition nozzle, first material composition is no longer under stress and is in the gel solidification state so as to form a first and second pattern layer such as to form a space with a cross section that varies along with the first and second pattern layer;
    at least one second material deposition nozzle configured to deposit in a space between the first and the second pattern layer the second material to form a shaped 3D object identical in shape to the space between the first and second pattern layers;
    a table configured to receive and hold the first material and the second material; and
    a heater to heat the table to a temperature that is higher than the environment temperature.

14. A system comprising:
    a first material composition of pseudo-plastic material configured to be in a gel aggregate state under stress and configured to be in a gel solidification state when no longer under stress;
    a second material different from the first material composition;
    a first material deposition nozzle;
    a material supply mechanism configured to supply the first material composition to the first material deposition nozzle, wherein the material supply mechanism is configured to agitate the first material composition to be in the gel aggregate state, and the first material deposition nozzle is configured to dispense a flow of the first material composition in the gel aggregate state, so that upon leaving the first deposition nozzle, first material composition is no longer under stress and is in the gel solidification state so as to form a first and second pattern layer such as to form a space with a cross section that varies along with the first and second pattern layer;

at least one second material deposition nozzle configured to deposit in a space between the first and the second pattern layer the second material to form a shaped 3D object identical in shape to the space between the first and second pattern layers;

at least two sources of curing radiation to cure the first and the second material;

a table configured to receive and hold the first material and the second material; and a heater to heat the table to a temperature that is higher than the environment temperature.

15. A system comprising:

a first material composition of pseudo-plastic material configured to be in a gel aggregate state under stress and configured to be in a gel solidification state when no longer under stress;

a second material different from the first material composition and having inclusions of additive materials with properties different from the properties of the second material therein;

a first material deposition nozzle;

a material supply mechanism configured to supply the first material composition to the first material deposition nozzle, wherein the material supply mechanism is configured to agitate the first material composition to be in the gel aggregate state, and the first material deposition nozzle is configured to dispense a flow of the first material composition in the gel aggregate state, so that upon leaving the first deposition nozzle, first material composition is no longer under stress and is in the gel solidification state so as to form a first and second pattern layer such as to form a space with a cross section that varies along with the first and second pattern layer;

at least one second material deposition nozzle configured to deposit in a space between the first and the second pattern layer the second material to form a shaped 3D object identical in shape to the space between the first and second pattern layers;

at least two sources of curing radiation to cure the first material and the second material;

a table configured to receive and hold the first material and the second material; and a heater to heat the table to a temperature that is higher than the environment temperature, wherein the at least one second material deposition nozzle is configured to deposit the second material following hardening of the first and second pattern layer.

* * * * *